Nov. 9, 1971  A. E. CHRISTENSEN  3,618,149

PLEASURE BOAT WITH RETRACTABLE WHEELS

Filed Nov. 24, 1969  2 Sheets-Sheet 1

INVENTOR.
ARNOLD E. CHRISTENSEN
BY
ATTORNEYS

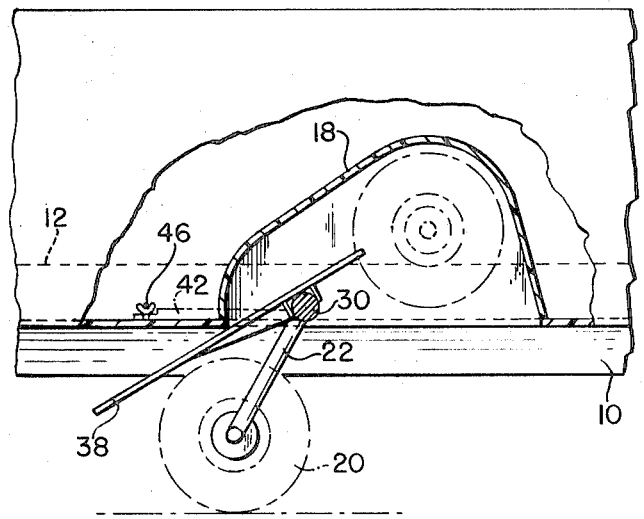
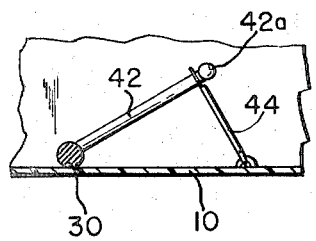
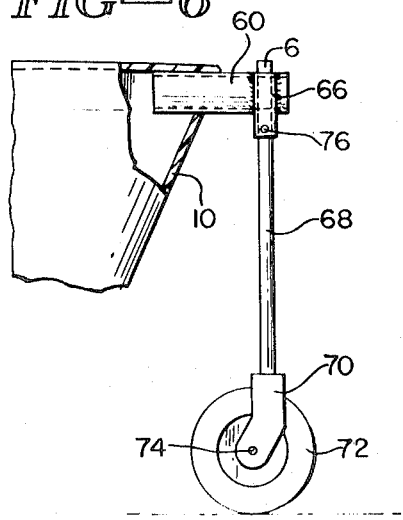
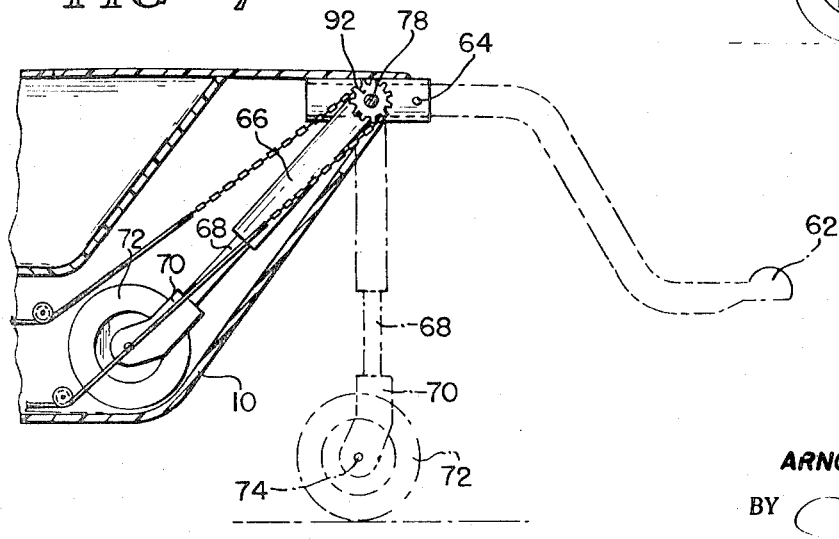

United States Patent Office 3,618,149
Patented Nov. 9, 1971

3,618,149
PLEASURE BOAT WITH RETRACTABLE WHEELS
Arnold E. Christensen, 6818 Bentley Road,
Puyallup, Wash. 98371
Filed Nov. 24, 1969, Ser. No. 879,303
Int. Cl. B63c *13/00*
U.S. Cl. 9—1 T        4 Claims

ABSTRACT OF THE DISCLOSURE

A boat having integral rear wheels for transporting the boat on land with a tow vehicle is disclosed. The rear wheels are retractable out of sight when the boat is water borne. The boat also has a bow wheel used in conjunction with the two rear wheels for transporting the boat into and out of the water once disconnected from the tow vehicle. Means is provided for retracting the rear wheels and bow wheel from a single position within the boat.

BACKGROUND OF THE INVENTION

Field of the invention

This invention relates to a pleasure boat in which road wheels therefor are carried by the boat and are retractable from a lowered position when the boat is being trailed from a tow vehicle into an elevated position when the boat is water borne.

PRIOR ART RELATING TO THE DISCLOSURE

More and more people are investing in pleasure boats of a size that can be pulled behind tow vehicles. Most pleasure boats today are loaded onto boat trailers, transported to public or pivate launch areas, the trailer backed into the water and the boat unloaded. The trailer and tow vehicle is then parked in a nearby location. Throughout the country the number of public launch areas for these boats has failed to keep pace with the number of people who own water craft with the result of overcrowding. Elimination of the boat trailer needed to transport pleasure boats on land would alleviate overcrowding to some extent. Boats have integral wheels associated therewith for transporting a boat on land, the wheels retracted when the boat is water borne, have been proposed, as noted by U.S. Pats. Nos. 2,501,750; 2,539,693; 2,740,135; 2,890,466; and 2,893,019. The various ways proposed for providing integral retractable wheels for a pleasure boat described in the above patents are either impractical or too expensive; thus a commercially feasible boat with retractable wheels has never gained wide acceptance.

In addition to providing a boat having retractable wheels associated therewith for transporting the boat on land, it is desirable to provide a boat with some means for easily propelling it into the water once it is disconnected from the tow vehicle and for getting it out of the water to reconnect it to the tow vehicle.

SUMMARY OF THE INVENTION

This invention relates to a boat having retractable rear wheels, the boat also having a removable forward wheel used when moving the boat into and out of the water after disconnection from the tow vehicle. The forward wheel can be made to retract to a position within the boat if desired.

It is a primary object of this invention to provide a pleasure boat which can be transported on land without a boat trailer and which can be transported in and out of the water with ease.

It is a further object of this invention to provide a pleasure boat which has an attractive appearance when it is being trailed behind a tow vehicle and when it is in the water.

BRIEF DESCRIPTION OF THE DRAWINGS

FIG. 4 is a partial side elevational view of the boat showing an alternative control system for lowering and retracting the rear wheels;

FIG. 5 is a partial sectional view of FIG. 4 showing the manner in which the torsion rod carrying the rear wheels is locked in place when the wheels are in lowered position;

FIG. 6 is a side elevational view of the bow of the boat showing the removable bow wheel in operative position; and FIG. 7 is a cross sectional view of the bow of the boat of this invention showing the bow wheel in retracted position and representing by dotted lines the position of the removable towing bar and the operative position of the bow wheel.

DETAILED DESCRIPTION OF THE INVENTION

Figure 1:
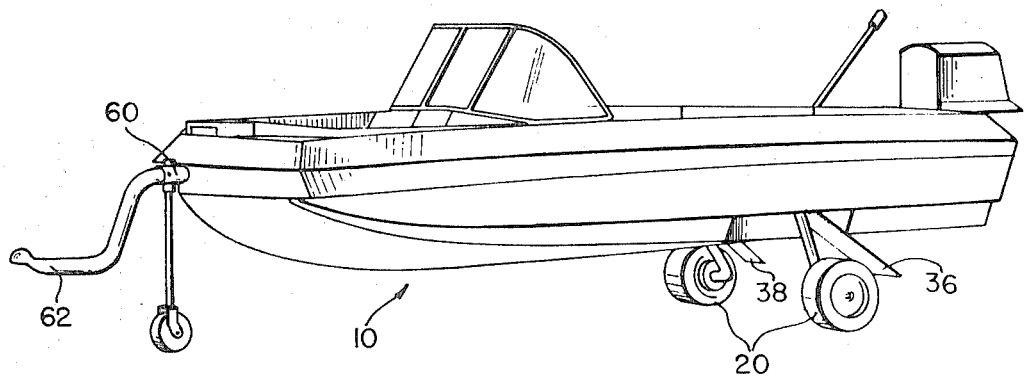
FIG. 1 is a perspective view of the boat of this invention with the rear wheels in a lowered position, the forward bow wheel in a lowered position and the removable tow bar attached to the bow.
Figure 2:
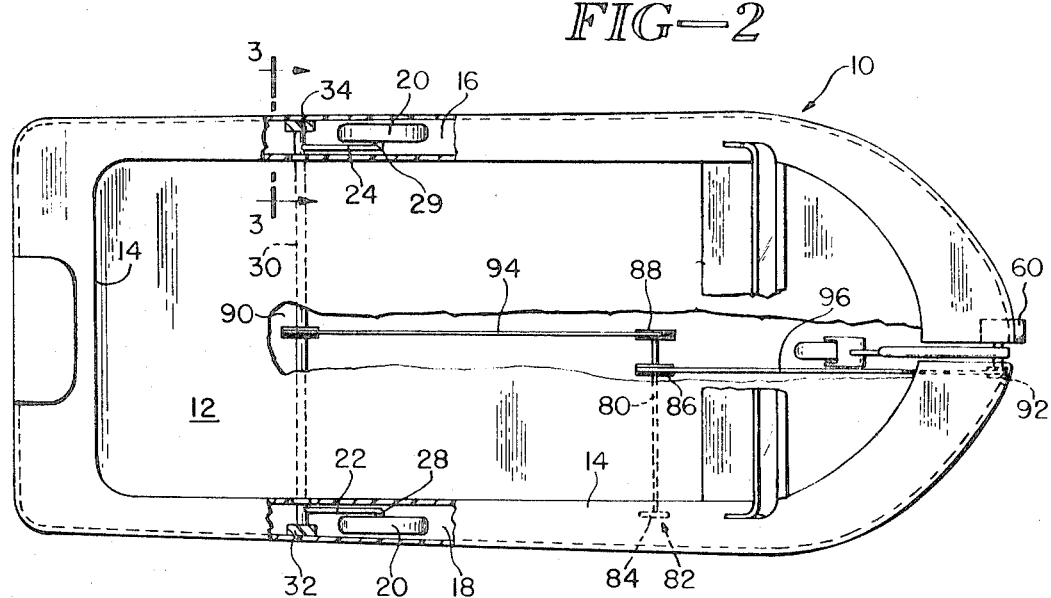
FIG. 2 is a top plan view of the boat of this invention with parts thereof broken away to show in detail one method of retracting both the rear wheels and the bow wheel from a single position within the boat.

Referring to FIG. 1 a boat is shown having rear wheels located back of the longitudinal center of gravity of the boat, a removable bow wheel and removable towing bar attached to the bow of the boat. The boat itself may be fabricated of any material; however, glass fiber reinforced construction of the boat is preferred. The boat comprises a hull 10, a floor 12 and sidewalls 14. The floor and sidewalls are spaced from the hull as shown. The floor and sidewalls are supported from the hull by suitable structural members or a structural foam material such as a rigid polyurethane foam. On each side of the boat are located open bottom, waterproof pockets 16 and 18. Each pocket is sized and shaped to accommodate a wheel 20 together with torsion arms 22 and 24. The wheels 20 are journalled for rotation on stub axles 28 and 29 connected to one end of the torsion arms. The two respective opposite ends of torsion arms 22 and 24 are rigidly connected to torsion rod 30 which extends the full width of the hull of the boat as shown in FIG. 2 and is journaled for rotation in reinforcing members 32 and 34 secured to the hull on each side of the boat. The rear wheel assembly, including the torsion rod, torsion arms and wheels is located back of the longitudinal center of gravity of the boat so that the boat, when towed, will trail behind the tow vehicle satisfactorily. Torsion rod 30 preferably extends within the space between the floor 12 of the boat and the bottom of the hull with access provided to the space through an opening located more or less midway along the width of the boat. The torsion rod is rotatable about its axis to retract the wheels carried by the torsion arms into the respective pockets or lower the wheels into position for towing of the boat. Both rear wheels are provided with covers 36 and 38 which, when the wheels are in lowered position, function as mud flaps. In retracted position the covers close the bottom opening in each of the side pockets entirely. As shown in FIG. 4 the covers 36 and 38 are attached at one end to torsion rod 20. A reinforcing rib extends from the trosion rod down a portion of the length of the covers.

The wheels may be elevated and lowered by a hand operated lever 42 as shown in FIGS. 4 and 5. FIG. 5 shows the position of the hand lever 42 when the wheels are in lowered position. The hand lever is rigidly connected to the torsion rod 30 at about its mid point and preferably has a ball 42a on its free end which can be attached to a shock absorber 44. Shock absorber 44 has one end connected to the boat hull and the opposite end connected to lever 42 by a ball hitch. When the hand lever is rotated counterclockwise the wheels are retracted into the side pockets. The hand lever is preferably welded or otherwise rigidly secured to torsion rod 30 at a point on the rod so that when the wheels are in retracted position the hand lever lies substantially parallel with the bottom of the boat hull as shown in FIG. 4. When the wheels are in retracted position they are locked in place by a lever arm tie down 46 (see FIG. 4). Access to the lever for lowering and retracting the rear wheels of the boat is through an opening cut in the floor of the boat. A door attached by suitable hinges to the floor of the boat can be provided for closure of the opening. When the wheels are lowered for transporting the boat on land the lever arm is locked into the position shown in FIG. 5. The door covering the opening in the floor is left open so that the lever arm can extend therethrough.

Figure 3:
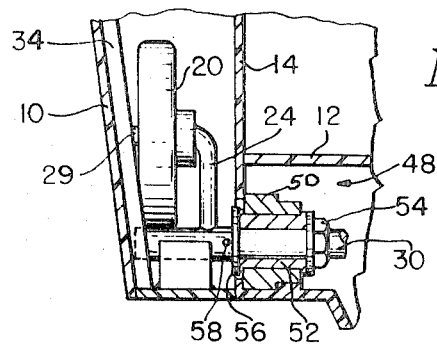
FIG. 3 is a transverse vertical sectional view of enlarged scale along line 3—3 of FIG. 2 showing one of the rear wheels in retracted position and details of the seal between the wheel pockets and the interior of the boat.

Water is prevented from entering the boat at the points where torsion rod 30 extends through the inner wall of the respective pockets 16 and 18 by suitable packing glands 48 as shown in FIG. 3. A sleeve 50 is fitted in each end of the space between the floor and bottom of the hull and is rigidly connected to the boat hull and to the floor of the boat. The sleeve has a bushing 52 of elastomeric material bonded to the sleeve. This bushing is placed under compression so as to tightly grip the torsion rod by endwise pressure exerted from nut 54 threaded on the torsion rod. Thrust pressure from the nut is accepted by washer 56 which bears against pin 58 extending through torsion rod 30.

Near the top of the bow of the boat is horizontally mounted a hollow sleeve member 60 adapted to receive a tow bar 62 of the configuration shown in FIG. 1 and FIG. 7. When the boat is to be towed by a tow vehicle the tow bar is inserted into the sleeve 60 and locked in place with a pin 64 (FIG. 7) which extends through the sleeve and tow bar. A set screw or other suitable means may also be used. Welded or otherwise secured to sleeve member 60 or to the hull of the boat is a second sleeve member 66 which extends transversely to sleeve member 60. A bow wheel support member 68 extends through sleeve 66. On the free end of the support member 68 is connected pivotable fork 70, between the tines of which forward wheel 72 is mounted for rotation on shaft 74. When the boat is being towed by the tow vehicle the bow wheel is raised out of contact with the road surface. The bow wheel is locked into position by a set screw 76 or other suitable means. When the boat is ready to be launched the bow wheel is lowered into contact with the ground, the boat disconnected from the tow vehicle and pushed into the water. As the bow wheel is free to swivel about support member 68 the boat can be directed to the location desired. Before the boat is put in the water the tow bar is removed from sleeve 60 and stored either in the boat or in the tow vehicle. Once the boat is in the water the bow wheel is removed from sleeve member 66 and stored in the boat. The rear wheels are retracted into side pockets 16 and 18 and locked into place. The boat is then ready to be used. When taking the boat out of the water the rear wheels are lowered in the water to their lowered position, the bow wheel locked into place as shown in FIG. 1 and the boat driven out of the water onto the beach or launching area by the boat motor.

FIG. 2 and FIG. 7 illustrate an alternate means of retracting both the rear wheels and the bow wheel from one position within the boat. The bow wheel is attached to the boat in a different manner than described previously in order that it can be retracted within the boat. This is shown by FIG. 7. Sleeve member 66 is rigidly secured to shaft 78 located near the top of the boat hull. The bow support member 68 carrying the bow wheel 72 is telescoped into sleeve member 66 and locked into position by a set screw or other suitable means. The sleeve member 66 and support member 68 carrying wheel 72 are rotatable about shaft 78 from a position inside the boat hull to a position in contact with the ground as shown in phantom in FIG. 7. An opening of suitable dimensions is cut in the sidewall 14 of the boat to allow the bow wheel to be rotated to either of the positions shown in FIG. 7. The opening cut in the side wall of the boat may be covered with a hinged door if desired.

Control means are provided adjacent the usual controls for the boat motor to retract and lower the rear wheels and retract and extend the bow wheel from the driver's position. As shown in FIG. 2 a shaft 80 extends beneath the floor of the boat, the shaft mounted for rotation to support members extending from the hull and/or floor of the boat. On the end of the shaft 80 adjacent the controls 82 for the boat motor is rigidly connected lever 84. To the opposite end of the shaft are attached sprockets 86 and 88. These sprockets are preferably located about midway along the width of the boat. Corresponding sprockets 90 and 92 are respectfully rigidly attached to torsion rod 30 and shaft 78. Chains 94 and 96 extend between sprockets 88 and 90 and sprockets 86 and 92. The diameters of the respective sprockets with respect to each other is such that rotation of lever 84, when the rear wheels are in elevated position and the bow wheel is in retracted position, will lower the rear wheels to the position shown in FIG. 4 and extend the bow wheel to the posiiton in phantom in FIG. 7. Locking means (not shown), such as spring biased keys which snap into place in the torsion rod 30 and shaft 78 are provided to lock the rear wheels into their elevated and lowered positions respectively and to lock the bow wheel in its retracted and extended position. Suitable guide means can be provided for the chains 94 and 96 as needed.

Using the retraction means shown in FIG. 2 the boat is disconnected from the tow vehicle, the tow bar removed as previously described, the boat backed into the water. The driver of the boat need only open the access panel for the bow wheel, sit in the driver's seat and rotate lever 84 to retract both of the rear wheels and the bow wheel. Once the boat is in the water the amount of force needed to retract the rear wheels and the bow wheel is significantly reduced. The forward wheel is preferably made of a light weight material such as aluminum which does not corrode and which can be easily moved from retracted to extended positions.

When the boat is being trailed, the rear wheels are in lowered position. The torsion rod acting in conjunction with the flexure of the torsion arms springs the trailed boat. It is not necessary to use the shock absorbing means 44 shown in FIG. 5 although it may be desirable.

Changes in the details of construction can be resorted to without departing from the spirit of the invention and it is my intention that no limitations be implied and that the annexed claims be given the broadest interpretation to which the language of the specification fairly admits.

The embodiments of the invention in which an exclusive property or privilege is claimed are defined as follows:

1. A boat having integral rear wheels for transporting the boat on land with a tow vehicle, the wheels retractable out of sight when the boat is water borne, and a bow wheel used in conjunction with the two rear wheels for transporting the boat into and out of the water after disconnection from the tow vehicle, comprising, a hull having a pair of waterproof open bottom pockets on each of its sides, each of the inner walls of the pockets having openings therein communicating with the interior of the hull, an elastomeric bushing seal for each of the inner wall openings, a rear wheel assembly including (1) a torsion rod extending transversely the full width of the hull through the inner wall openings and the elastomeric bushing seals, the extreme ends of the torsion rod resting on reinforced portions of the hull, (2) torsion arms rigidly connected to the torsion rod at points on the rod so they occupy an approximate horizontal plane within each of the pockets, (3) stub axles extending transversely from near the free ends of the torsion arms, and (4) wheels journaled for rotation to the stub axles, a forward bow wheel assembly mounted on the bow of the boat hull for rotation in a vertical plane, the bow wheel assembly including (1) a shaft extending transversely of the hull and journaled for rotation to the hull near the top of the bow, (2) a telescoping support member rigidly attached to the shaft for rotation therewith in a transverse vertical plane relative to the shaft, and (3) a wheel having its axle journaled for rotation near the free end of the telescoping member, and control means operatively connected to the rear and bow wheel assemblies operable from a single position within the boat for rotating the rear and the bow wheel assemblies from a retracted position wherein the rear wheels are housed within the pockets and the bow wheel is housed inside the hull to a lowered position wherein the rear wheels are exposed below the hull and the bow wheel extended.

2. The boat of claim 1 wherein the control means includes (1) a control shaft mounted for rotation extending transversely of the hull beneath the floor of the boat, (2) a lever rigidly connected to the control shaft operable from the driver's position in the boat to rotate the shaft, and (3) linkage means running between the control shaft, torsion rod of the rear wheel assembly and shaft of the bow wheel assembly for rotating the rear and bow wheel assemblies from their retracted positions to their lowered positions respectively, and for returning them to their respective retracted positions.

3. The boat of claim 2 wherein the linkage means includes (1) sprockets rigidly connected to the torsion rod, control shaft and shaft of the bow wheel assembly and (2) chains trained around the respective sprockets, the diameters of the sprockets so sized that rotation of the sprockets connected to the control shaft a short distance rotates the rear wheels and bow wheel from their retracted positions.

4. The boat of claim 1 including a horizontal opening near the top of the bow of the boat hull adapted to receive an elongated tow bar, and a removable tow bar adapted to be locked in place in the horizontal opening.

References Cited

UNITED STATES PATENTS

| | | | |
|---|---|---|---|
| 2,283,648 | 5/1942 | Samdahl | 9—1 |
| 2,863,159 | 12/1958 | Bear | 9—1 |
| 3,085,261 | 4/1963 | Kennedy | 9—1 |
| 3,158,881 | 12/1964 | Clausen | 9—1 |
| 3,436,773 | 4/1969 | Richardson | 9—1 |

FOREIGN PATENTS

| | | | |
|---|---|---|---|
| 649,243 | 1/1951 | Grat Britain | 9—1 |
| 798,956 | 7/1958 | Great Britain | 9—1 |

MILTON BUCHLER, Primary Examiner

F. K. YEE, Assistant Examiner

U.S. Cl. X.R.

280—414 A